(12) United States Patent
Hu et al.

(10) Patent No.: US 7,177,000 B2
(45) Date of Patent: Feb. 13, 2007

(54) LIQUID CRYSTAL DISPLAY CELL STRUCTURE AND MANUFACTURE PROCESS OF A LIQUID CRYSTAL DISPLAY COMPRISING AN OPENING FORMED THROUGH THE COLOR FILTER AND PARTIALLY THE BUFFER LAYER

(75) Inventors: Chih-Jen Hu, Zhongli (TW);
Ching-Huan Lin, Sinying (TW);
Chih-Ming Chang, Zhongli (TW)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 53 days.

(21) Appl. No.: 10/848,174

(22) Filed: Mar. 20, 2004

(65) Prior Publication Data
US 2005/0259201 A1  Nov. 24, 2005

(51) Int. Cl.
*G02F 1/1333* (2006.01)
*G02F 1/1337* (2006.01)
*G02F 1/1335* (2006.01)

(52) U.S. Cl. .............. 349/122; 349/129; 349/106
(58) Field of Classification Search ............... 349/125
See application file for complete search history.

(56) References Cited
U.S. PATENT DOCUMENTS 3,932,026 A * 1/1976 Sprokel .............. 349/138
6,100,953 A    8/2000 Kim et al. ............ 349/129
6,587,173 B2   7/2003 Yoo et al. ............ 349/129
6,593,982 B2   7/2003 Yoon et al. ........... 349/106
6,611,308 B2   8/2003 Wu et al. ............. 349/129
6,912,027 B2 * 6/2005 Kim .................... 349/114
2002/0044229 A1 * 4/2002 Kim .................... 349/43
2002/0113927 A1 * 8/2002 Ha et al. .............. 349/113
2002/0159012 A1 * 10/2002 Yamada ................ 349/122
2003/0030767 A1 * 2/2003 Takizawa et al. ...... 349/113
2003/0030768 A1 * 2/2003 Sakamoto et al. ...... 349/113
2003/0174269 A1 * 9/2003 Tanaka et al. ......... 349/129
2004/0252261 A1 * 12/2004 Wen et al. ............ 349/114

* cited by examiner

*Primary Examiner*—Andrew Schechter
*Assistant Examiner*—W. Patty Chen
(74) *Attorney, Agent, or Firm*—Raggio & Dinnin, P.C.

(57) ABSTRACT

In a process of forming a LCD cell structure, an electrode layer provided with a recessed portion is formed over a substrate, and a transparent dielectric layer is formed to cover the recessed portion of the pixel electrode layer. The recessed portion of the electrode layer acts to distort an electric field created in the liquid crystal of the LCD system for image displaying, while the transparent dielectric layer eliminates the boundary conditions created by the concavity of the recessed portion of the electrode layer.

16 Claims, 8 Drawing Sheets

LIQUID CRYSTAL DISPLAY CELL STRUCTURE AND MANUFACTURE PROCESS OF A LIQUID CRYSTAL DISPLAY COMPRISING AN OPENING FORMED THROUGH THE COLOR FILTER AND PARTIALLY THE BUFFER LAYER

BACKGROUND OF THE INVENTION

1. Field of the Invention

The present invention generally relates to liquid crystal display (LCD) systems, and more particularly to a multi-domains LCD cell structure and a process of forming a LCD substrate.

2. Description of the Related Art

In LCD systems, the liquid crystal molecules are oriented in different directions to selectively allow light passage and thereby achieve image displaying. In the early times of the LCD technique, each pixel cell was operated to orient the liquid is crystal molecules parallel to one single and specific direction to display an image. As a result, the viewing angle of the LCD systems was narrow.

In more recently developed display systems, some techniques have been implemented to mitigate this disadvantage. In this regard, the Japanese company Fujitsu, Ltd has developed a technique in which each pixel cell is divided into a number of domains where the liquid crystal molecules can be aligned along different directions. In this technique, protrusions are provided on the surface of an inner layer in contact with the liquid crystal. The protrusions create boundary conditions that tilt the inclination angle of the liquid crystal molecules differently in each domain, which can provide a wide viewing angle.

FIG. 1 illustrates another technique known in the art for forming a multi-domains LCD without inner protrusions. In FIG. 1, the cell structure 10 includes a liquid crystal layer 15 sandwiched between two substrates 12, 14. A pixel electrode 17 is formed on a surface of the lower substrate 12. A light-shielding layer 19 is formed on a surface of the upper substrate 14 to prevent light leakage. A color filter 22 is formed to cover a portion of the light-shielding layer 19. A common voltage electrode 26 is formed over the color filter 22 and includes recessed portions 28.

When a voltage bias is applied between the pixel electrode 17 and the common voltage electrode 26, the recessed portions 28 of the common voltage electrode 26 act to distort the electric field generated in the liquid crystal layer 15. As a result, the liquid crystal molecules tilt in different directions to produce a multi-domain alignment in the pixel cell.

A disadvantage of the design described in FIG. 1 is that the recessed portions of the common voltage electrode create boundary conditions that undesirably orient the liquid crystal molecules. Therefore, there is a need for a multi-domain LCD that can overcome the disadvantages of the prior art.

SUMMARY OF THE INVENTION

The present application describes a LCD cell structure and a process implemented in the manufacture of a LCD system. In one embodiment, the LCD comprises: a first substrate including at least one switching device connected to a first electrode, a second substrate including a second electrode, and a liquid crystal layer sandwiched between the first and second substrates. The first or second electrode includes one or more recessed portion covered with a transparent dielectric layer. The first or second electrode provided with the recessed portion is operable to distort an electric field generated in the liquid crystal layer for displaying an image.

In an embodiment, a process of forming a LCD substrate comprises forming a transparent conductive layer provided with a recessed portion over a substrate, wherein the transparent conductive layer forms a pixel electrode, and covering the recessed portion of the transparent conductive layer with a transparent dielectric layer. In an embodiment, forming a transparent conductive layer provided with a recessed portion further comprises forming a base layer over the substrate, patterning the base layer to form a recess therein, and forming a transparent conductive layer compliant to a surface contour of the recess in the base layer. According to various embodiments, the base layer can be a color filter or a dielectric layer.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENT(S)

The application describes a LCD cell structure that can improve the optical performance of the display system. In the description herein, the term "pixel electrode" generally encompasses a transmissive electrode, a reflective electrode, and/or a common voltage electrode. The LCD cell structure described herein can be suitable for various types of LCD systems such as transmissive LCD, reflective LCD, transflective LCD, or the like.

Figure 1:
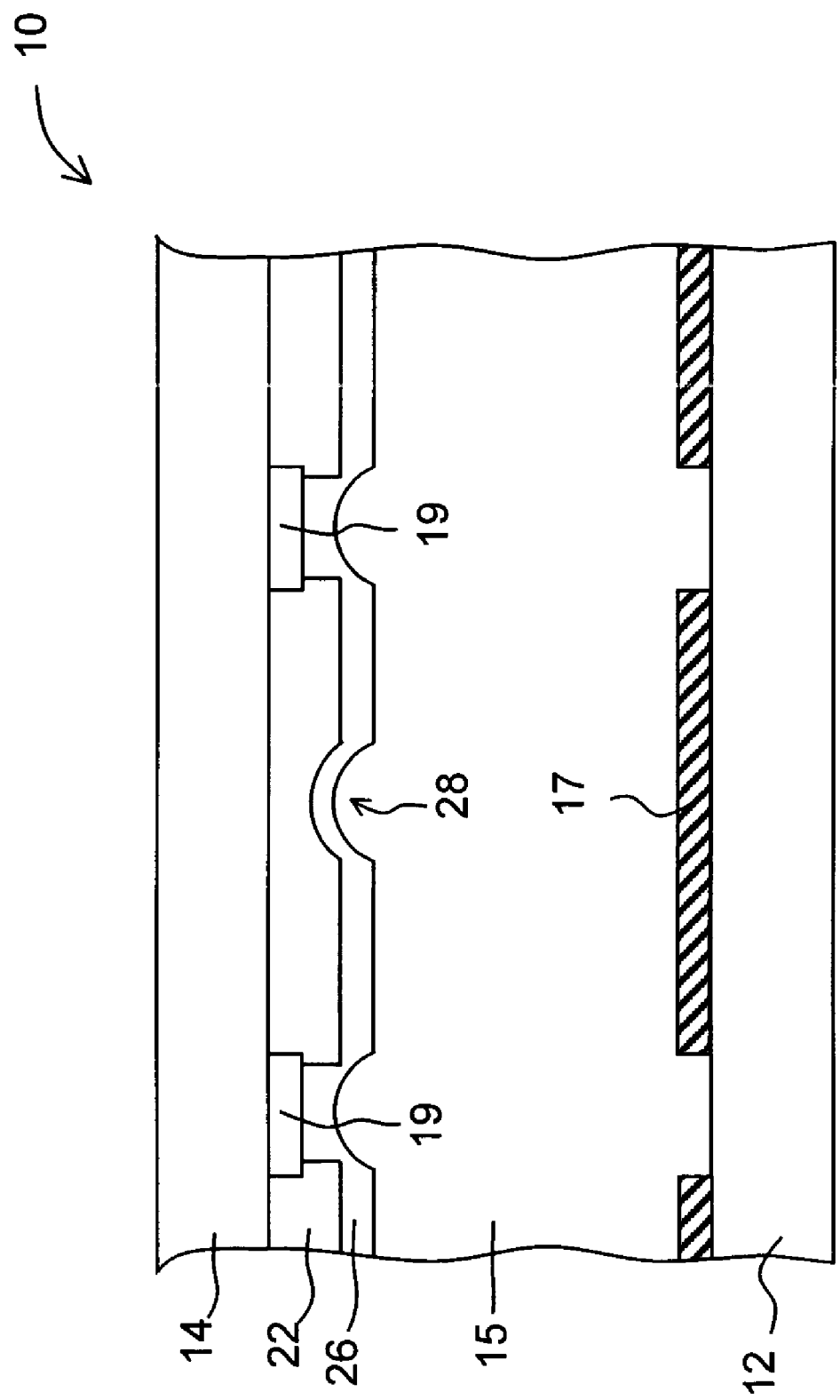
FIG. 1 is a schematic view of a LCD cell structure implemented in a liquid crystal display known in the art.
Figure 2A:
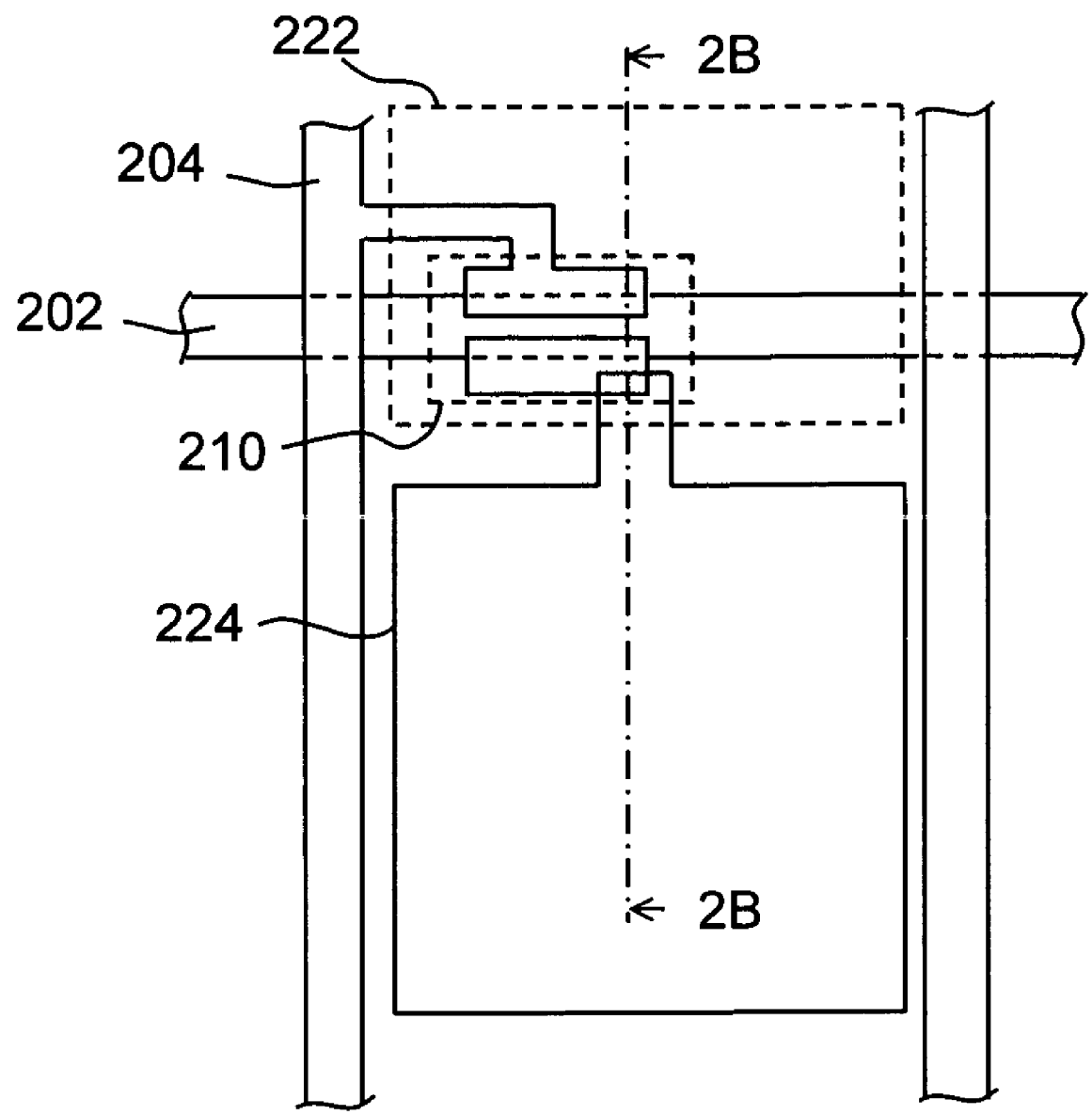
FIG. 2A is a top view of a LCD cell structure implemented in a transflective LCD according to an embodiment of the invention.
Figure 2B:
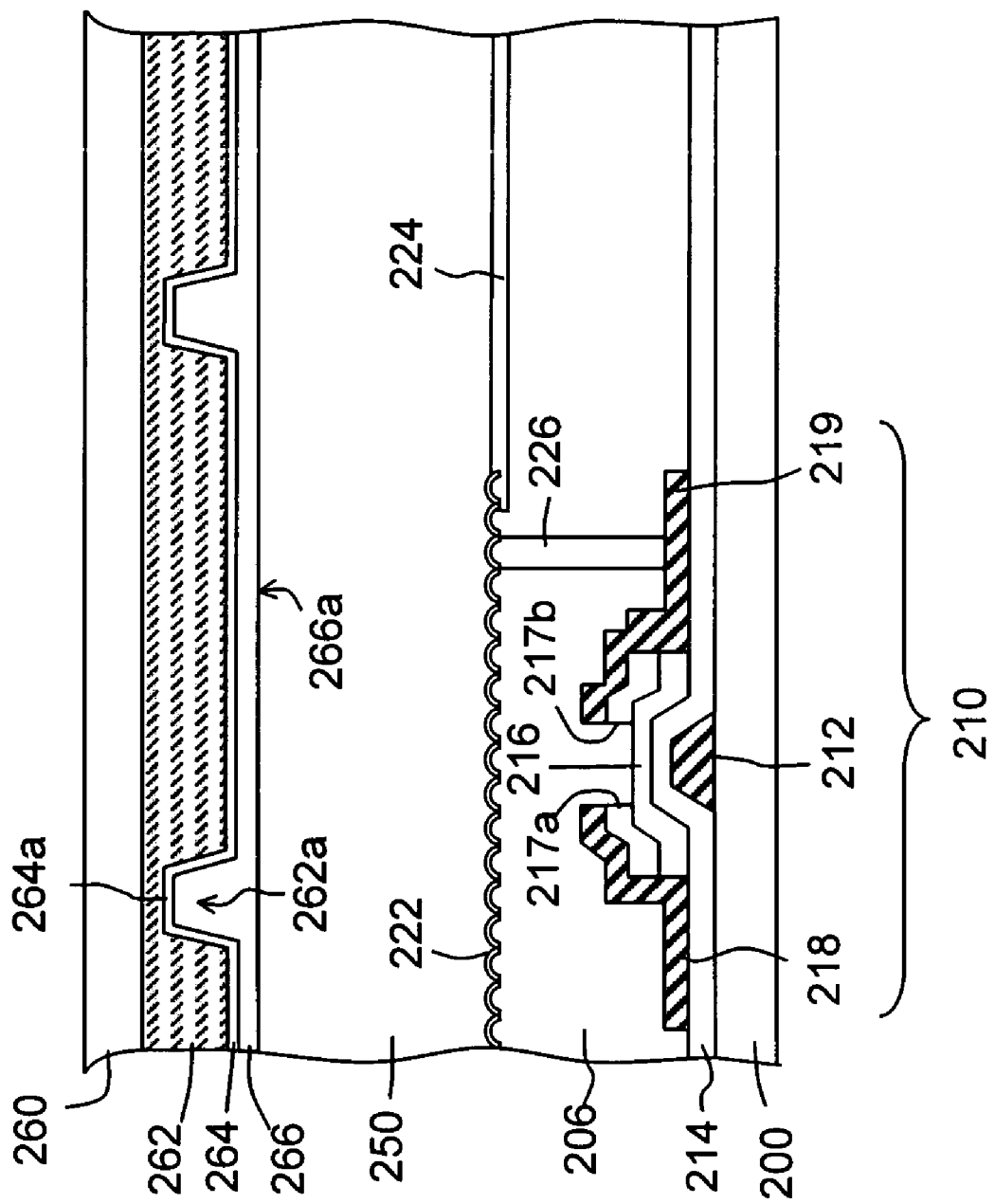
FIG. 2B is a cross-sectional view taken along section 2B—2B in FIG. 2A.

FIG. 2A–2B are schematic views of a LCD cell structure according to an embodiment of the invention. The illustration exemplary shows an implementation of the LCD cell structure in a transflective LCD system. The cell structure includes the assembly of a liquid crystal layer 250 sandwiched between first and second substrate 200, 260. A switching device 210 is formed on a surface of the first substrate 200 and is coupled with a gate line 202 and data line 204 to control the light modulation of the liquid crystal layer 250. In the illustrated embodiment, the switching device 210 exemplary can be a thin film transistor.

As illustrated in the sectional view of FIG. 2B, the thin film transistor 210 can include a gate electrode 212 coupled with the gate line 202, a gate-insulating layer 214 covering the gate electrode 212, a semiconductor layer 216 on the gate-insulating layer 214, ohmic contact layers 217a, 217b, and source 218 and drain 219 respectively formed on the ohmic contact layers 217a, 217b.

A passivation layer 206 covers the thin film transistor 210. Reflective, transmissive electrode 222, 224 are formed on a surface of the passivation layer 206, and respectively connect via a contact hole 226 to the drain 219 while the source 218 is connected to the data line 204. The reflective electrode 222 can be made of a metallic material having an adequate reflectance (such as aluminum or Ag), while the transmissive electrode 224 can be made of a transparent conductive material such as indium tin oxide, indium zinc oxide or the like. More than one reflective, transmissive electrode 222, 224 can be provided in one pixel of the transflective LCD.

A color filter 262 is formed on a surface of the second substrate 260. The illustration of FIG. 2B shows the color filter 262 being formed on an inner surface of the second substrate 260, but it will be understood that the color filter can be also formed at other locations as described later. The color filter 262 can be formed via a dyeing method or a dispersing method.

The color filter 262 includes one or more recess 262a. A common voltage electrode 264 made of a transparent conductive material such as indium tin oxide of indium zinc oxide is formed compliant to the surface contour of the color filter 262. The common voltage electrode 264 includes a recess portion 264a in the area of the recess 262a. The recessed portion 264a of the common voltage electrode 264 acts to distort the electric field produced in the liquid crystal layer 250 under the application of electric signals to the thin film transistor 210. As a result, a multi-domain alignment of the liquid crystal molecules can be produced within each pixel.

A transparent dielectric layer 266 is formed on the surface of the common voltage electrode 264, and covers the recessed portion 264a. The layer 266 has a low dielectric constant. Further, the organic dielectric layer 266 can have a substantially planar surface 266a. The coverage of the common voltage electrode 264 by the organic dielectric layer 266 eliminates the undesirable boundary conditions caused by the concavity of the recessed portion 264a.

Figure 2C:
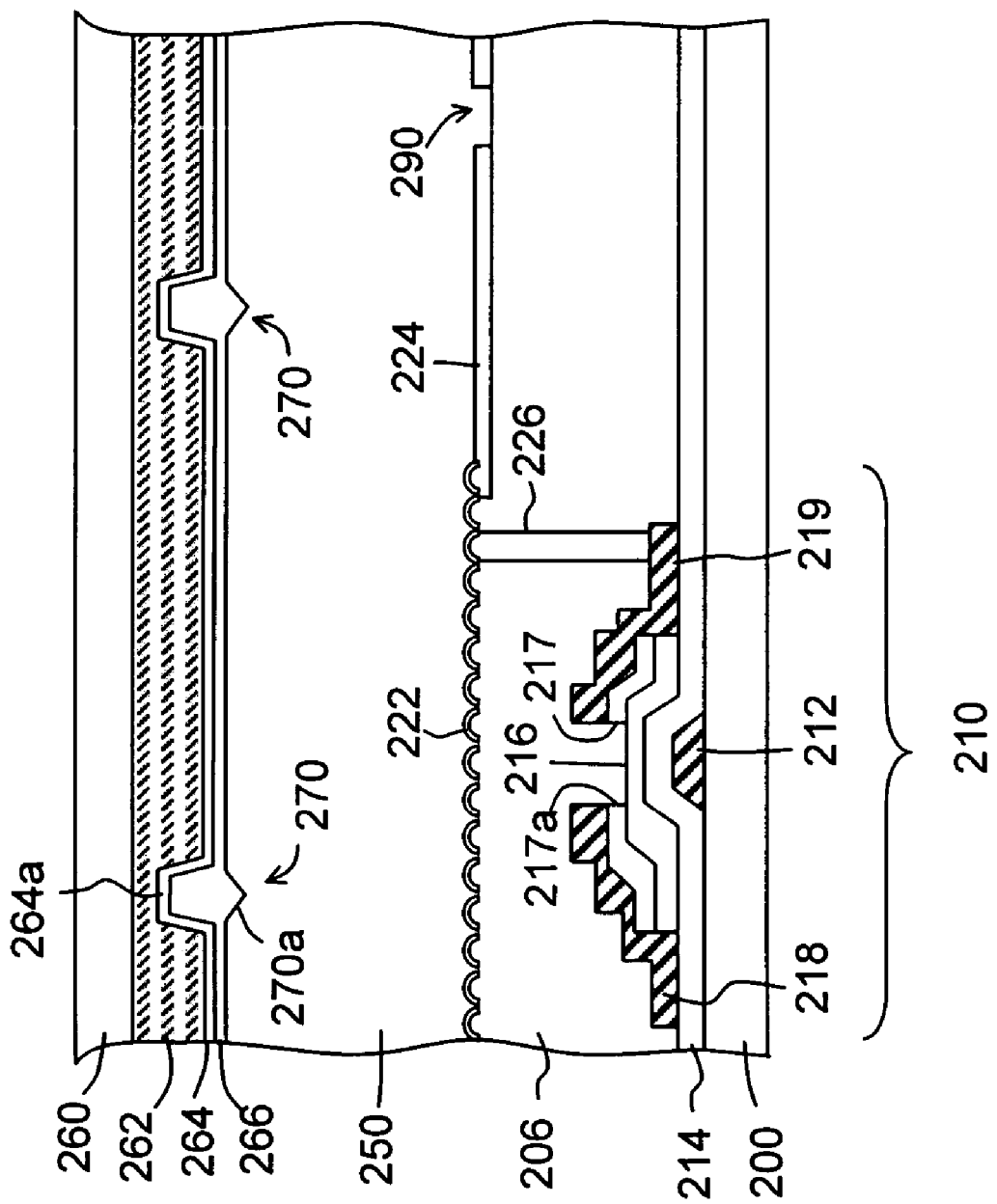
FIG. 2C is a cross-sectional view of a LCD cell structure implemented in a transflective LCD according to a variant embodiment of the invention.

FIG. 2C illustrates a variant embodiment in which a protrusion 270 can be formed on the surface of the dielectric layer 266 at a location corresponding to the recessed portion 264a of the common voltage electrode 264. The protrusion 270 can be integrally formed with the dielectric layer 266 or separately formed thereon. Materials adequate to form the protrusion 270 can include a photoresist material or a dielectric material. The protrusion 270 includes convex side edges 270a that create boundary conditions to orient the liquid crystal molecules when no electrical field is produced in the liquid crystal layer. The LCD optical response time can be thereby increased when the display cell switches from an Off-state to an On-state. Further, one or more slit 290 can be formed in the reflective or transmissive electrode 222, 224 to alleviate the occurrence of disclination lines.

Figure 2D:
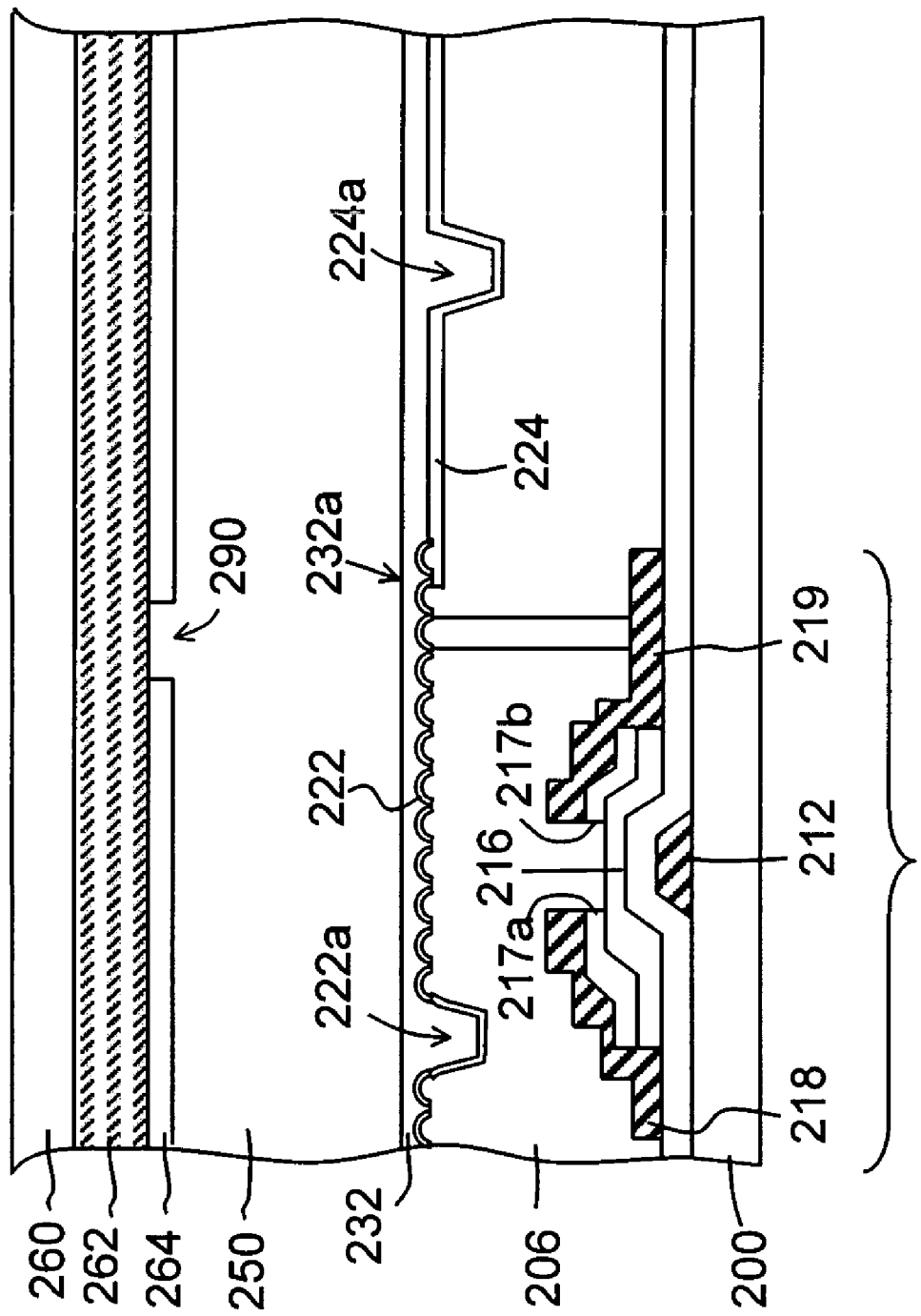
FIG. 2D is a cross-sectional view of a LCD cell structure implemented in a transflective LCD according to another embodiment of the invention.

FIG. 2D illustrates an additional embodiment wherein the reflective and/or transmissive electrode 222, 224 can be configured to respectively include recessed portions 222a, 224a for distorting the electric field generated in the liquid crystal layer 250. In this case, a transparent dielectric layer 232 is formed over the substrate 200 to cover the reflective, transmissive electrode 222, 224. The dielectric layer 232 provides a substantially planar surface 232a that covers the recessed portions 222a, 224a, and thereby eliminates the undesirable boundary conditions of the liquid crystal molecules. One or more slit 290 can be formed in the common voltage electrode 264 to prevent the generation of disclination lines in the liquid crystal.

Figure 2E:
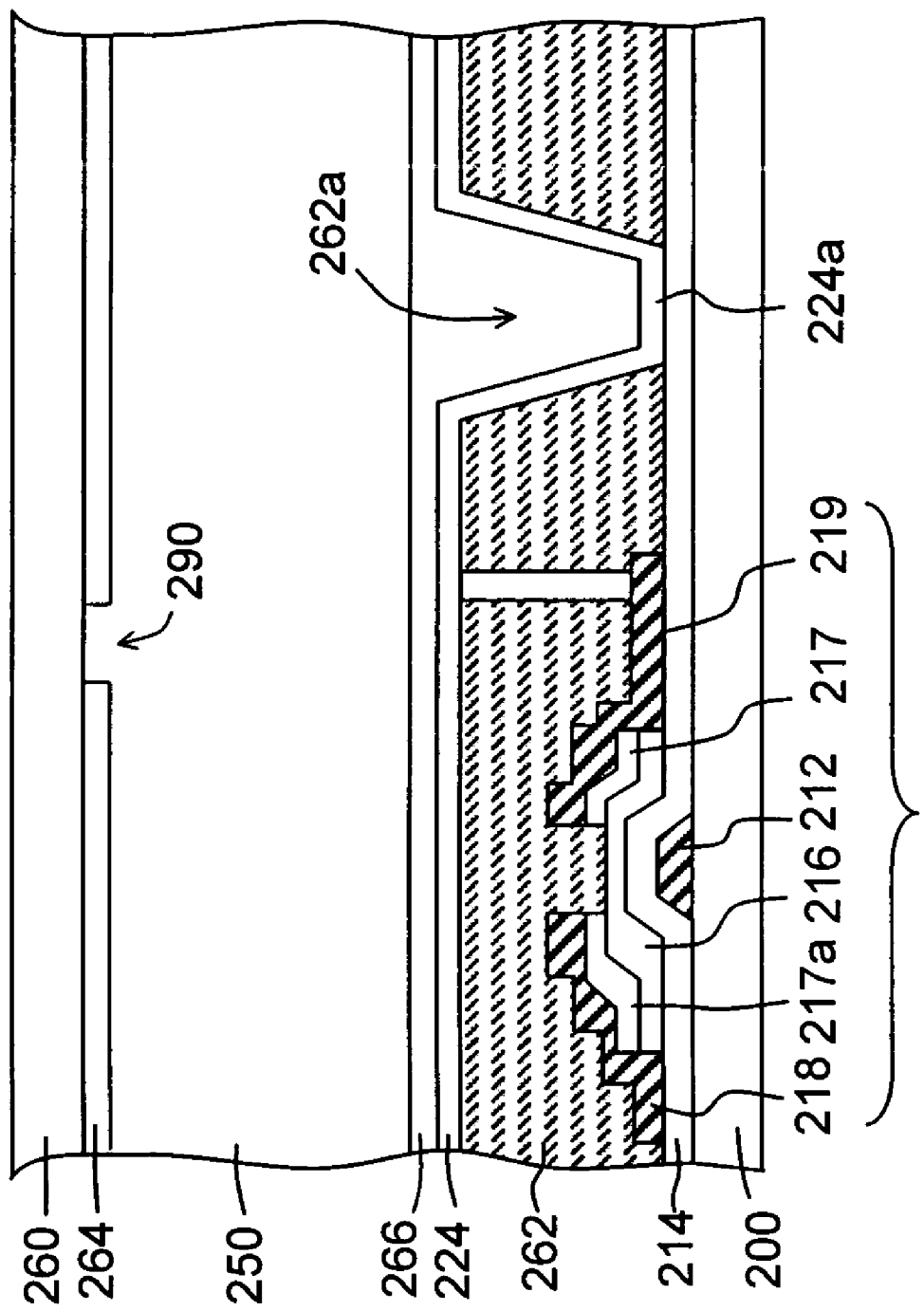
FIG. 2E is a cross-sectional view of a LCD cell structure implemented in a transmissive LCD according to an embodiment of the invention.

FIG. 2E shows another variant embodiment implemented as a transmissive LCD, in which the color filter can be formed on the same substrate of the thin film transistors. The substrate 200 carries the array of thin film transistor 210. A color filter 262 is formed over the substrate 200 to cover the thin film transistor 210. The color filter 262 includes a recess 262a. A transmissive electrode 224 is formed on the color filter 262 and forms a recessed portion 224a in the recess 262a of the color filter 262. The transparent dielectric layer 266 having a planar surface 266a covers the transmissive electrode 224 and its recessed portion 224a.

FIG. 3A–3D describe a process implemented in the manufacture of a liquid crystal display according to an embodiment of the invention. The term "pixel electrode" as used herein encompasses a transmissive electrode, a reflective electrode, or a common voltage electrode.

Figure 3A:
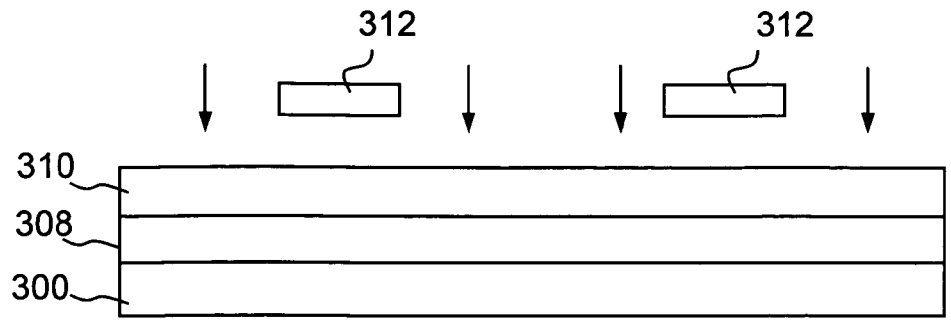
FIG. 3A~3G are schematic views of a process implemented in the manufacture of a liquid crystal display according to an embodiment of the invention.

As shown in FIG. 3A, a stack including a buffer layer 308 and a base layer 310 is formed over a substrate 300. The buffer layer 308 can be made of a photosensitive material or a transparent dielectric material. Photolithography and etching processes are performed to form recess structures in the base layer 310 and the buffer layer 308. The buffer layer 308 is provided to control the depth of the recess structures, but can be omitted in other embodiments.

Figure 3B:
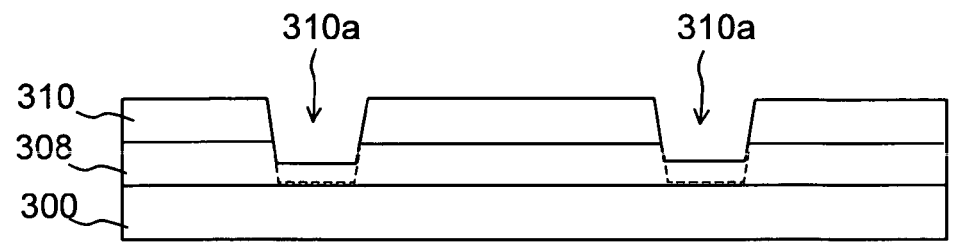

In an embodiment in which the base layer 310 is a color filter made of a photoresist material, the buffer layer 308 can also be made of a photoresist material. The photolithography process can include exposing the color filter material and the buffer layer 308 via one or more pattern mask 312, and developing the base layer 310 and buffer layer 308 to form the recess 310a therein, as shown in FIG. 3B. The recess 310a is formed with a depth that can reach up to the surface of the substrate 300. The depth of the recess 310a is set to control the level of distortion of the electric field in the liquid crystal layer.

Figure 3C:
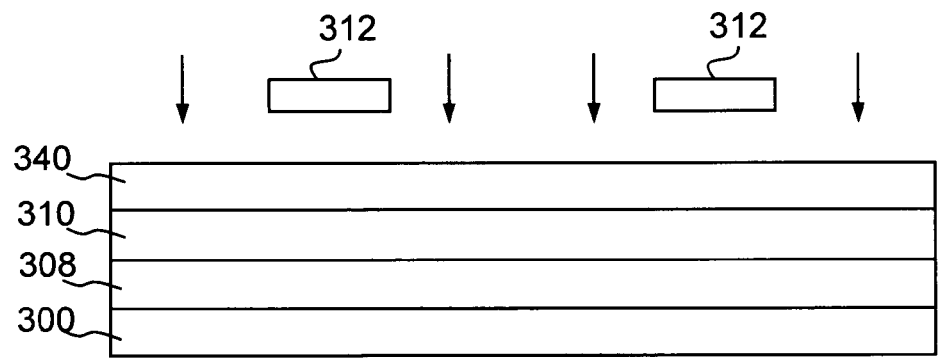
Figure 3D:
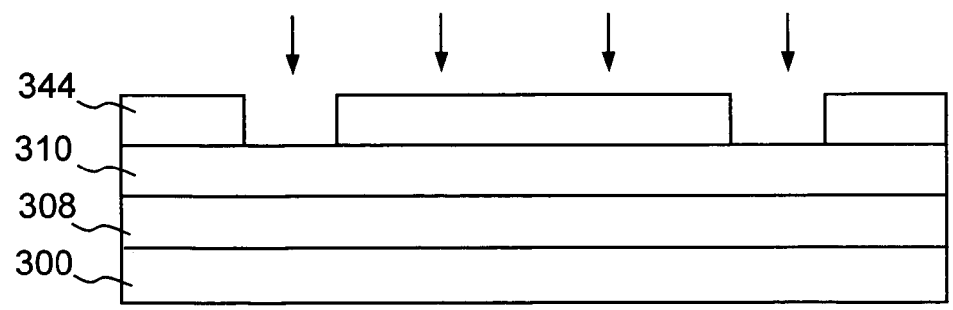

In the variant embodiment illustrated in FIG. 3C–3D, the buffer layer 308 and the base layer 310 can be made of an organic dielectric-based material. In the photolithography process, a photoresist layer 340 is formed on the base layer 310, and is subsequently exposed through the pattern mask 312. After exposure, the photoresist layer 340 is developed to form a photoresist pattern 344. The base layer 310 and the buffer layer 308 are subsequently etched through the photoresist pattern 344 to form the recess 310a. The photoresist pattern 344 then is removed.

Figure 3E:
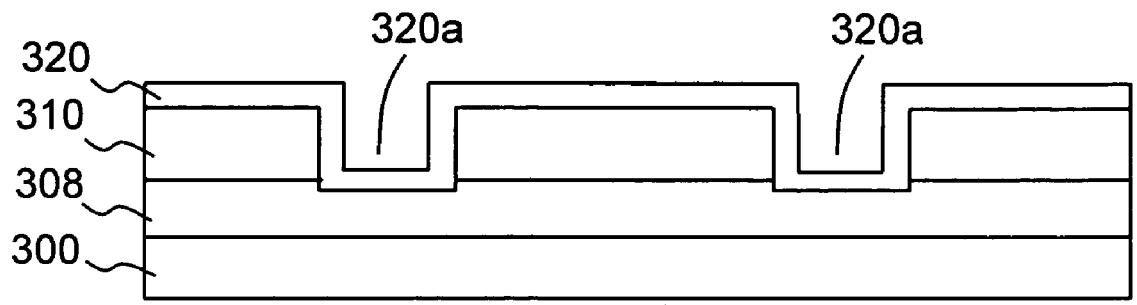

Referring to FIG. 3E, a transparent conductive material is formed over the base layer 310 approximately conformal to the contour of the recess 310a. The transparent conductive material can be indium tin oxide, indium zinc oxide, or the like. The transparent conductive material constitutes a pixel electrode 320 having recessed portion 320a.

Figure 3F:
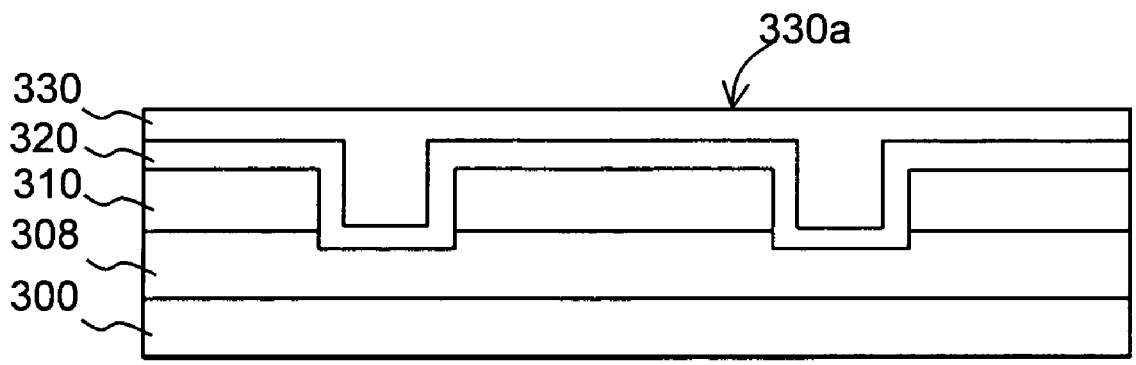

Referring to FIG. 3F, a transparent dielectric layer 330 is formed on the pixel electrode 320 in a manner to fill the recessed portion 320a. The transparent dielectric layer 330 can be made of an organic dielectric material. The transparent dielectric layer 330 is planarized to have a substantially planar surface 330a that covers the pixel electrode 320.

Figure 3G:
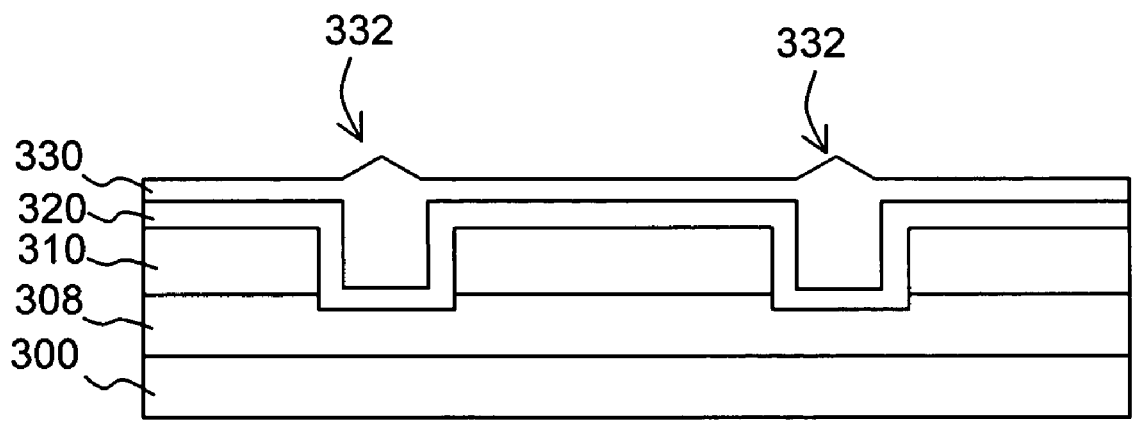

FIG. 3G illustrates a variant embodiment in which one or more protrusion 332 can be formed over the transparent dielectric layer 330 at a location corresponding to the recessed portion 320a of the pixel electrode 320. The protrusion 332 can be formed along with the dielectric layer 330, or separately deposited on the transparent dielectric layer 320.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Additionally, structures and functionality presented as discrete components in the exemplary configurations may be implemented as a combined structure or component. These and other variations, modifications, additions, and improvements may fall within the scope of the invention as defined in the claims that follow.

What is claimed is:

1. A liquid crystal display, comprising:
   a first substrate, including at least one switching device coupled with a gate line and a data line, wherein the switching device is connected to a first electrode;
   a second substrate, including a buffer layer, a color filter and a second electrode; and
   a liquid crystal layer sandwiched between the first and second substrates;
   wherein the second electrode includes one or more recessed portions extending in an opening formed through the color filter and the buffer layer, a bottom surface of the opening lying on a thickness of the buffer layer, and the one or more recessed portions being covered with a transparent dielectric layer.

2. The liquid crystal display of claim 1, wherein the first electrode is formed on a surface of a dielectric layer covering the switching device.

3. The liquid crystal display of claim 1, wherein the transparent dielectric layer has a substantially planar surface.

4. The liquid crystal display of claim 1, wherein one or more protrusion project from a surface of the transparent dielectric layer.

5. The liquid crystal display of claim 4, wherein the one or more protrusions is placed at an area corresponding to the location of one recessed portion.

6. The liquid crystal display of claim 1, wherein the transparent dielectric layer includes an organic dielectric material or a photoresist material.

7. The liquid crystal display of claim 1, wherein the first electrode includes a transmissive part and a reflective part.

8. A process of forming a liquid crystal display substrate, comprising:
   forming a buffer layer over a substrate;
   forming a color filter over the buffer layer;
   patterning an opening through the color filter and the buffer layer, a bottom surface of the opening lying on a thickness of the buffer layer;
   forming a transparent conductive layer over the color filter, wherein the transparent conductive layer forms an electrode having a recessed portion at the opening; and
   covering the recessed portion of the transparent conductive layer with a transparent dielectric layer.

9. The process of claim 8, wherein the buffer layer is made of a material including a photoresist material or an organic dielectric material.

10. The process of claim 8, wherein patterning an opening through the color filter and the buffer layer includes performing a photolithography process.

11. The process of claim 8, wherein the transparent dielectric layer includes an organic dielectric material or a photoresist material.

12. The process of claim 8, wherein the transparent dielectric layer is planarized to have a substantially planar surface.

13. The process of claim 8, wherein a protrusion is formed on the transparent dielectric layer.

14. A liquid crystal display, comprising:
   a first substrate including at least one switching device coupled with a gate line and a data line, wherein the switching device is connected to a first electrode;
   a second substrate, including a buffer layer, a color filter and a second electrode; and
   a liquid crystal layer sandwiched between the first and second substrates;
   wherein the second electrode includes one or more recessed portions extending in an opening etched through the color filter and the buffer layer, and a bottom surface of the opening lies on a thickness of the buffer layer.

15. The liquid crystal display of claim 14, wherein the one or more recessed portions is covered with a transparent dielectric layer.

16. The liquid crystal display of claim 15, wherein the transparent dielectric layer includes an organic dielectric material or a photoresist material.

* * * * *

UNITED STATES PATENT AND TRADEMARK OFFICE
CERTIFICATE OF CORRECTION

PATENT NO.        : 7,177,000 B2                                                Page 1 of 1
APPLICATION NO.   : 10/848174
DATED             : February 13, 2007
INVENTOR(S)       : Chin-Jen Hu et al.

It is certified that error appears in the above-identified patent and that said Letters Patent is hereby corrected as shown below:

On Title Page
Item 73
Page 1, Column 1:

The "Assignee" is incorrectly shown as "Automotive Systems Laboratories, Inc of Farmington Hills, MI".

The "Assignee" should be shown as --AU OPTRONICS CORPORATION of Hsinchu, Taiwan, ROC--

Signed and Sealed this

Eighteenth Day of September, 2007

JON W. DUDAS
*Director of the United States Patent and Trademark Office*